United States Patent [19]

Cocoma et al.

[11] Patent Number: 5,103,140

[45] Date of Patent: * Apr. 7, 1992

[54] STARTING CIRCUIT FOR AN ELECTRODELESS HIGH INTENSITY DISCHARGE LAMP

[75] Inventors: John P. Cocoma, Clifton Park; George A. Farrall, Rexford, both of N.Y.

[73] Assignee: General Electric Company, Schenectady, N.Y.

[*] Notice: The portion of the term of this patent subsequent to Oct. 15, 2008 has been disclaimed.

[21] Appl. No.: 622,024

[22] Filed: Dec. 4, 1990

[51] Int. Cl.$^5$ .............................................. H05B 41/16
[52] U.S. Cl. .................................... 315/248; 315/344; 313/234
[58] Field of Search .................. 315/248, 39, 344, 85, 315/348, 267; 313/234

[56] References Cited

U.S. PATENT DOCUMENTS

| | | | |
|---|---|---|---|
| 4,810,938 | 3/1989 | Johnson et al. | 315/248 |
| 4,812,702 | 3/1989 | Anderson | 313/153 |
| 4,894,589 | 1/1990 | Borowiec | 315/248 |
| 4,894,590 | 1/1990 | Witting | 315/248 |
| 4,902,937 | 2/1990 | Witting | 315/248 |
| 4,959,584 | 9/1990 | Anderson | 313/160 |

Primary Examiner—Eugene R. LaRoche
Assistant Examiner—A. Zarabian
Attorney, Agent, or Firm—Jill M. Breedlove; James C. Davis, Jr.; Marvin Snyder

[57] ABSTRACT

A starting circuit for an electrodeless HID lamp, comprising a series resonant LC circuit of variable impedance, provides a starting voltage to a fixed or movable starting probe substantially simultaneously with the application of power to the excitation coil from the main power source. In a preferred embodiment, the starting circuit provides a starting signal to a gas probe starter of the type including a fixed starting electrode coupled to a starting chamber which contains a relatively low-pressure gas and is attached to the outer wall of the arc tube. Resonant operation of the starting circuit results in the application of a sufficiently high voltage to ignite a glow discharge in the low-pressure starting chamber. In turn, the starting voltage is capacitively coupled to the arc tube, ionizing the fill and initiating an arc discharge therein. In an alternative embodiment, additional circuitry is provided for ensuring that the glow discharge in the low-pressure starting chamber is extinguished after initiation of the arc discharge.

22 Claims, 3 Drawing Sheets

STARTING CIRCUIT FOR AN ELECTRODELESS HIGH INTENSITY DISCHARGE LAMP

RELATED PATENT APPLICATIONS

This patent application is related to commonly assigned U.S. patent application of J. T. Dakin et al. entitled "A Starting Aid for an Electrodeless HID Lamp", Ser. No. 07/622,026, and to commonly assigned U.S. patent application of V. D. Roberts et al., entitled "Gas Probe Starter for an Electrodeless High Intensity Discharge Lamp", Ser. No. 07/622,247, and to commonly assigned U.S. patent application of G. A. Farrall et al., entitled "Two-Stage Resonant Starting Circuit for an Electrodeless High Intensity Discharge Lamp", Ser. No. 07/622,246, which patent applications are filed concurrently herewith and incorporated by reference herein.

FIELD OF THE INVENTION

The present invention relates generally to electrodeless high intensity discharge (HID) lamps and, more particularly, to a starting circuit for such a lamp.

BACKGROUND OF THE INVENTION

In a high intensity discharge (HID) lamp, a medium to high pressure ionizable gas, such as mercury or sodium vapor, emits visible radiation upon excitation typically caused by passage of current through the gas. One class of HID lamps comprises electrodeless lamps which generate an arc discharge by generating a solenoidal electric field in a high-pressure gaseous lamp fill. In particular, the lamp fill, or discharge plasma, is excited by radio freqency (RF) current in an excitation coil surrounding an arc tube. The arc tube and excitation coil assembly acts essentially as a transformer which couples RF energy to the plasma. That is, the excitation coil acts as a primary coil, adn the plasma functions as a single-turn secondary. RF current in the excitation coil produces a time-varying magnetic field, in turn creating an electric field in the plasma which closes completely upon itself, i.e., a solenoidal electric field. Current flows as a result of this electric field, resulting in a toroidal arc discharge in the arc tube.

At room temperature, the solenoidal electric field produced by the excitation coil is typically not high enough to ionize the gaseous fill and thus initiate the arc discharge. One way to overcome this shortcoming is to lower the gas pressure of the fill, fo example, by first immersing the arc tube in liquid nitrogen so that the gas temperature is decreased to a very low value and then allowing the gas temperature to increase. As the temperature rises, an optimum gas density to eventually reached for ionization, or breakdown, of the fill to occur so that an arc discharge is initiated. However, the liquid nitrogen method of initiating an arc discharge is not practical for widespread commercial use.

More recent methods for starting electrodeless HID lamps entail using starting aids to capacitively couple the high voltage developed across the excitation coil turns into the arc tube. As a result of this voltage gradient, a capacitive current flows between the starting aid and the excitation coil, and hence through the arc tube, thereby ionizing the gaseous fill and producing a low current glow discharge therein. When the gas is sufficiently ionized, a transition is made from a relaively low current glow discharge to a relatively high current, high intensity solenoidal arc discharge. Such a starting aid may comprise, for example, a pair of capacitive starting electrodes, as described in U.S. Pat. No. 4,902,937 of H. L. Witting, issued Feb. 20, 1900, and assigned to the isntant assignee, which patent is incorporated by reference herein. Each starting electrode comprises a conductive ring which surrounds the arc tube and is connected to the excitation coil of the HID lamp. Coupling a high voltage signal between the pair of starting electrodes causes an electric field to be produced therebetween in the arc tube due to the arc tube wall capacitance. Furthermore, as it has been determined that the application of relatively large electric fields directly to the arc tube via the starting aid may cause early arc tube degradation, heat sensitive members, e.g. bimetallic strips, are utilized for moving the starting electrodes away from the arc tube after initiating an arc discharge, thereby preserving the usefl life of the lamp.

A spiral starting electrode for an electrodeless HID lamp is described in U.S. Pat. No. 4,894,590 of H. L Witting, issued Jan. 16, 1990, and assigned to the instant assignee, which patent is incorporated by reference herein. A single, conical-spiral-shaped starting electrode is positioned so that its narrower end is adjacent to, or on, the arc tube surface. The wider end of the starting electrode is positioned so that flux generated by the excitation coil cuts the turns of the spiral electrode, thereby generating a high voltage signal which results in a sufficiently high electric field gradient to create a glow discharge in the arc tube. A bimetallic strip is utilized to move the starting electrode away from the arc tube after an arc discharge is initiated therein.

Starting electrodes which are moved from a rest position to a starting location adjacent to the arc tube by piezoelectric means are described in U.S. Pat. No. 4,894,589 of J. C. Borowiec, issued Jan. 16, 1990, and assigned to the instant assignee, which patent is incorporated by reference herein. The piezoelectric means is deactivated after an arc discharge is initiated, and the starting electrodes are moved back to the rest position. The piezoelectric means allows selective movement of the starting electrodes, thereby enabling the lamp to be restarted, if necessary, even if the arc tube is still hot.

In commonly assigned, copending U.S. patent application of H. L. Witting, Ser. No. 417,404, filed Oct. 5, 1989, another starting aid for an electrodeless HID lamp is described which comprises a first conductive coil disposed about a second conductive coil, each coil havinga truncated-cone shape. The coils are wound in opposite directions so that voltages induced therein add together to provide a sufficiently high electrc field gradient to initiate an arc discharge in the arc tube. A bimetallic support is used to move the starting aid between a starting position adjacent to the arc tube and a lamp-operating position at a predetermined location away from the arc tube. The Witting application is incorporated by reference herein.

Although each of the hereinabove described movable starting aids is effective in initiating an arc discharge in an electrodeless HID lamp, it is desirable in some applications to employ a fixed starting electrode. To be pracital, such a fixed starting electrode must include means for avoiding the application of large electric fields to the arc tube during normal lamp operation so as not ot reduce the useful life of the arc tube. Recently developed fixed starting aids for electrodelss HID lamps include a fixed starting electrode cupled to a starting chamber containing a gas, preferably at a low pressure relative to that of the arc tube fill, which chamber is attached to theouter surface of the arc tube. One such starting aid is the subject of Roberst et al. U.S. patent application, Ser. No. 07,622,247, cited hereinabove. As described in the Roberst et al. application, a starting voltage is applied to the starting electrode by a starting circuit, causing the low-pressure gas in the starting chamber to become conductive. As a result, a sufficiently high voltage is applied to the arc tube to ionize the gaseous fill in the arc tube, thus forming an arc discharge therein. After the lamp has started, the starting voltage is removed from the starting electrode in order to extinguish the discharge current in the chamber which would otherwise have a detrimental effect on the arc tube wall.

A suitable starting circuit for applying a starting voltage to either a fixed or movable starting aid is described in commonly assigned U.S. patent application of S. A. El-Hamamsy and R. J. Thomas, Ser. No. 527,500, filed May 23, 1990, which is incorporated by reference herein. The starting circuit of the El-Hamamsy and Thomas application comprises a high-efficiency power supply, including a tuned output circuit, for providing an RF signal to the starting electrode. Exemplary high-efficiency power supplies useful in the El-Hamamsy and Thomas startint circuit comprise Class-D and Class-E power amplifiers. The starting circuit operates at a high frequency than that used to operate the lamp ballast which drives the excitation coil. In this way, the starting circuit is independent of the lamp ballast circuit and, therefore, does not interfere with the operation thereof.

Although the starting circuit of the El-Hamasy and Thomas application is effective in initiating an arc discharge in an HID lamp, it may be desirable in some applications to simplify the starting circuitry of an HID lamp even further by, for example, eliminating the need for an additional power supply and employing only minimla, if any, active circuit components.

OBJECTS OF THE INVENTION

Accordingly, an object of the present invention is to provide a new and improved starting circuit for applying a starting signal to a starting electrode for initiating an arc discharge in an electrodeless HID lamp.

Another object of the present invention is to provide a starting circuit for initiating an arc discharge in an electrodless HID lamp, which starting circuit is driven by the main RF power supply and, hence, does not require an additional, separate power supply.

Still another object of the present invention is to provide a starting circuit, of simple construction, for an electrodless HID lamp employing minimal, if any, active circuit elements.

SUMMARY OF THE INVENTION

These and other objects of the present invention are achieved in a starting circuit for an electrodeless HID lamp which employs minimla, if any active circuit elements and provides a starting signal to either a fixed or movable starting probe substantially simultaneously with the application of power to the excitation coil from the main power source. The starting circuit cmoprises a series rseonant LC circuit of variable impedance including the series combination foa variable inductance and the parasitic capacitance between the starting probe and the excitation coil. The variable inductance may comprise either a tuning inductor, or a fixed inductor coupled in parallel with a tuning capacitor, or a fixed capacitor coupled in parallel with a tuning inductor. In a preferred embodiment, the starting circuit provides a starting signal to a starting probe coprising a fixed starting electrode coupled to a starting chamber which contains a relatively low-pressure gas and is attached to the outer wall of the arc tube, such a starting probe being hereinafter referred to as a gas probe starter.

In operation, the resonant circuit is tuned to a predetermined value so that, upon application of an RF signal to the excitation coil, resonant operation of the starting circuit results in the application of a sufficiently high starting voltage to the starting electrode to ignite a glow discharge in the starting chamber. In turn, the starting voltage is capacitively coupled to the arc tube, thereby ionizing the arc tube fill and initiating an arc discharge therein. Advantageously, this embodiment of the starting circuit comprises only passive elements.

In another preferred embodiment, a switch is employed in he resonant circuit in order to detune the startingt circuit after initiation of the arc discharge. In particular, the switch is opened after initiation of the arc discharge in order to ensure that the starting circuit becomes detuned so that the starting voltage is decreased sufficientloy to extinguish the glow discharge in the chamber. If desired, an additional resonant circuit, e.g. a parallel LC network, may be coupled across the switch to further ensure suppression of the glow discharge. By extinguishing the glow discharge, the flow of leakage currents between the starting chamber and the arc tube, which would otherwise eventually have a detrimental effect on the arc tube wall, is avoided.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
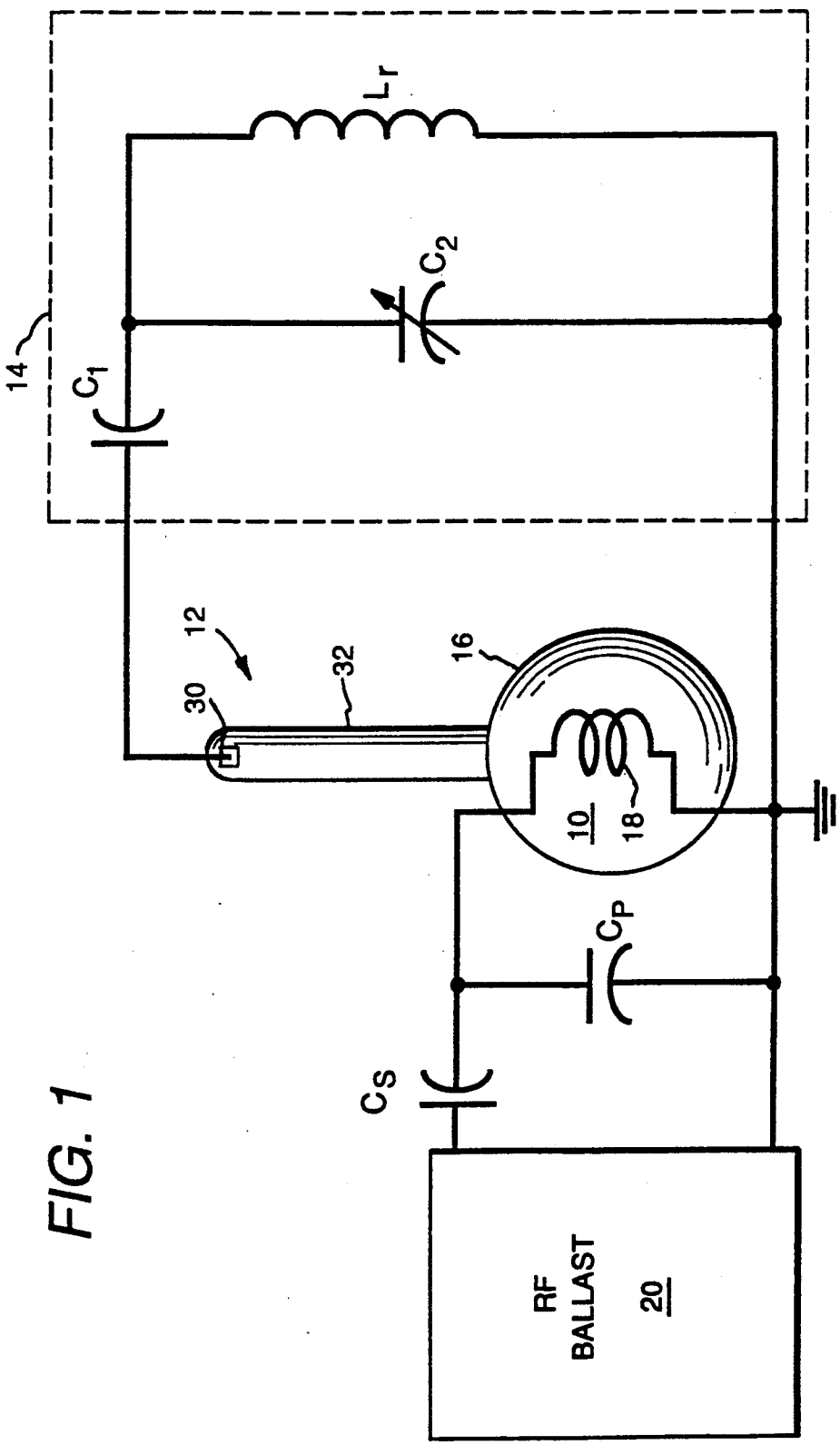
FIG. 1 is a schematic illustration of an electrodeless HID lamp system employing a gas probe starter and a starting circuit in accordance with a preferred embodiment of the present invention.

FIG. 1 illustrates an HID lamp system, including an electrodeless HID lamp 10 employing a starting probe 12 coupled to a starting circuit 14 in accordance with a preferred embodiment of the present invention. Lamp 10 includes a light-transmissive arc tube 16 preferably formed of a high temperature glass, such as fused quartz, or an optically transparent ceramic, such as polycrystalline alumina. An excitation coil 18 surrounds arc tube 16 and is coupled to a radio frequency (RF) ballast 20 for exciting an arc discharge in a fill contained within the arc tube. For clarity of illustration, however, excitation coil 18 is not shown in its operational position about arc tube 16, but is shown only schematically in FIG. 1.

A suitable arc tube fill, described in U.S. Pat. No. 4,810,938 of P. D. Johnson, J. T. Dakin and J. M. Anderson, issued on Mar. 7, 1989 and assigned to the present assignee, comprises a sodium halide, a cerium halide and xenon combined in weight proportions to generate visible radiation exhibiting high efficacy and good color rendering capability at white color temperatures. For example, such a fill according to the Johnson et al. patent may comprise sodium iodide and cerium chloride, in equal weight proportions, in combination with xenon at a partial pressure of about 500 torr. The Johnson et al. patent is incorporated by reference herein. Another suitable fill is described in copending U.S. patent application of H. L. Witting, Ser. No. 348,433, filed May 8, 1989, and assigned to the instant assignee, which patent application is incorporated by reference herein. The fill of the latter Witting application coprises a combination of a lanthanum halide, a sodium halide, a cerium halide and xenon or krypton as a buffer gas; for example, a fill according to the Witting application may comprise a combination of lanthanum iodide, sodium iodide, cerium iodide, and 250 torr partial pressure of xenon.

An exemplary excitation coil 18 is described in commonly assigned, copending U.S. patent application of G. A. Farrall, Ser. No. 493,266, filed Mar. 15, 1990, which is incorporated by reference herein. The overall shape of the excitation coil of the Farrall application, Ser. No. 493,266, is generally that of a surface formed by rotating a bilaterally symmetrical trapezoid about a coil center line situated in the same plane as the trapezoid, but which line does not intersect the trapezoid. However, other suitable coil configurations may be used with the starting aid of the present invention, such as that described in commonly assigned U.S. Pat. No. 4,812,702 of J. M. Anderson, issued Mar. 14, 1989, which patent is incorporated by reference herein. In particular, the Anderson patent describes a coil having six turns which are arranged to have a substantially V-shaped cross section on each side of a coil center line. Still another suitable excitation may be of solenoidal shape, for example.

RF ballast 20 may comprise, for example, a Class-D power amplifier, such as the ballast described in commonly assigned, copending U.S. patent application of S. A. El-Hamamsy and J. C. Borowiec, Ser. No. 472,144, filed Jan. 30, 1990, which is incorporated by reference herein. The Class-D ballast includes two switching devices connected in series with a dc power supply in a half-bridge configuration. In operation, the switching devices are driven alternately between cutoff and saturation such taht one is conducting while the other one is turned off and vice versa. Hence, the Class-D ballast may be conveniently driven by a square wave signal.

As illustrated in FIG. 1, a resonant load network is coupled to the output of ballast 20. The resonant load network comprises the excitation coil 18 of HID lamp 10 and a tuning capacitor $C_p$ connected in parallel therewith. The parallel combination of capacitor $C_p$ and coil 18 functions as an impedance transformer to reflect the impedance of the arc discharge into the ballast load. A blocking/tuning capacitor $C_s$ is connected in series with the parallel combination of coil 16 and capacitor $C_p$. In particular, capacitor $C_s$ is used both for blocking dc voltage and for resonant circuit tuning. As described in the El-Hamamsy and Borowiec patent application, cited hereinabove, capacitors $C_s$ and $C_p$ are chosen to ensure impedance matching for maximum efficiency.

By way of example, starting probe 12 is illustrated in FIG. 1 as comprising a gas probe starter, such as that described in Roberst et al. U.S. patent application, Ser. No. 07/622,247, cited hereinabove. In particular, gas probe starter 12 comprises a starting electrode 30 coupled to a starting chamber 32 which is attached to the outer wall of arc tube 16 and contains a gas. The gas in starting chamber 32 may comprise, for example, a rare gas at a pressure in the range from approximately 0.5 to 500 torr, with a preferred range being from approximately 5 to 40 torr. Preferably, the gas in chamber 32 is at a low pressure relative to that of the arc tube fill in order to promote even easier starting. In an exemplary HID lamp system, a suitable arc tube fill pressure may be approximately 200 torr while that of the gas in starting chamber 32 may be approximatley 20 torr. It is to be understood, however, that the starting circuit of the present invention may be used with other suitable types of starting probes, such as a gas probe starter of the type described in the Dakin et al. patent application, Ser. No. 07/622,026, or a fixed foil electrode of the type described in the El-Hamamsy and Thomas U.S. patent application, Ser. No. 527,500, cited hereinabove. Still other suitable starting electrodes may be movable, if desired, such as those described in: Witting U.S. Pat. No. 4,902,937; Witting U.S. Pat. No. 4,894,590; and Borowiec U.S. Pat. No. 4,894,589, all cited hereinabove.

Starting circuit 14 comprises a series resonant LC circuit of variable impedance including a variable inductance coupled in series with the parasitic capacitance $C_1$ between starting probe 12 and excitation coil 18. As shown in FIG. 1, the variable inductance may comprise the parallel combination of a fixed inductor $L_r$ and a tuning capacitor $C_2$. Alternatively, however, the advantages of the present invention may be achieved by using the parallel combination of a fixed capcitor and a tuning inductor, if desired. In still another alternative embodiment, the variable inductance simply comprises a variable, or tuning, inductor. In practice, however, variable inductors having precise, tunable reactances are relatively difficult to construct.

In operation, tuning capacitor $C_2$ of FIG. 1 is tuned to a predetermined value so that, when an RF signal is applied to excitation coil 18 via ballast 20, resonant operation of the LC starting circuit results in the application of a sufficiently high starting voltage to starting electrode 30 to ignite a glow discharge, i.e. a relatively low discharge current, in chamber 32. In turn, the starting voltage is capacitively coupled to arc tube 16, thereby ionizing the arc tube fill and initiating an arc discharge therein. Advantageously, starting circuit 14 of FIG. 1 employs only passive circuit elements and is thus simple in construction.

Figure 2:
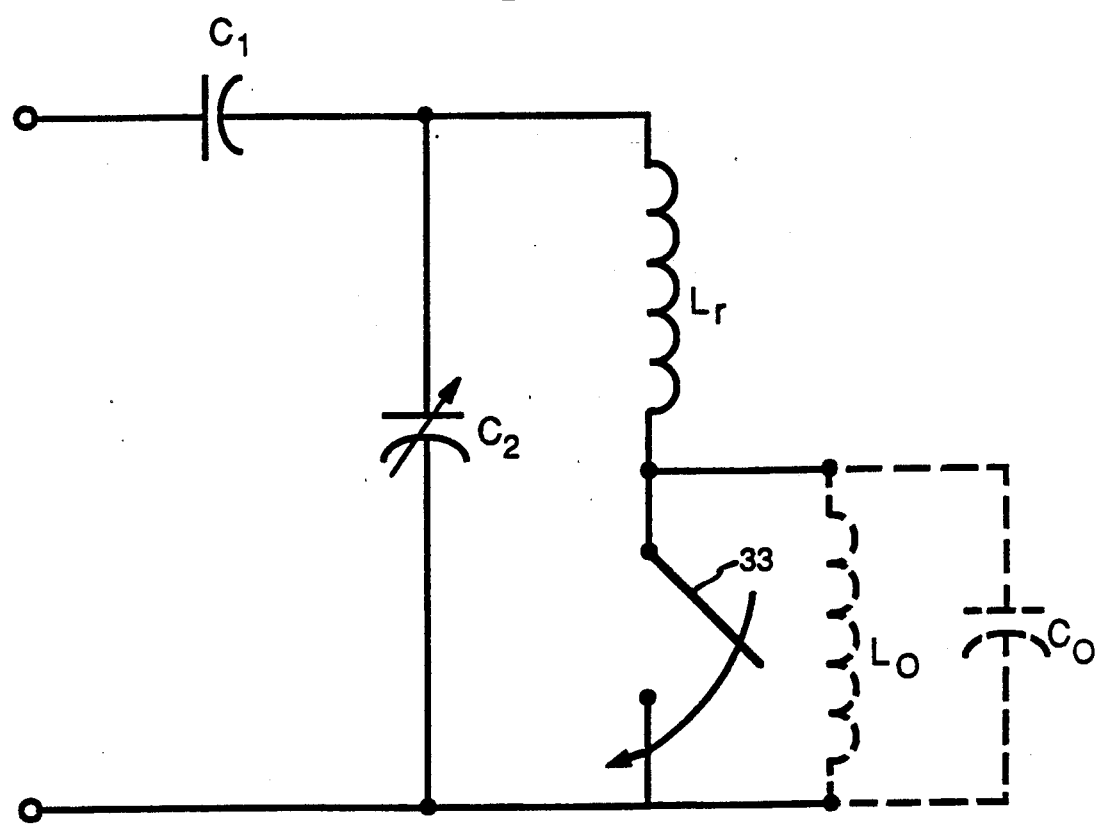
FIG. 2 is a schematic illustration of an alternative embodiment of the starting circuit of the present invention.

As another advantage, the impedance of starting circuit 14 changes upon initiation of teh glow discharge, often with the result that the starting voltage decreases sufficiently to extinguish the glow discharge in chamber 32. In this way, the arc tube wall is protected from leakage currents which might otherwise flow between the starting probe and the arc tube and eventually cause damage. In another preferred embodiment, as illustrated in FIG. 2, this subsequent detuning of startingt circuit 14 is ensured by coupling a switch 33 in series with inductor $L_r$. Initially, switch 33 is closed. However, after the arc discharge is initiated, the switch is opened, thus removign inductor $L_r$ from, and hence detuning, the circuit. Furtehrmore, an additional resonant circuit, e.g. a parallel LC network $L_o$ and $C_o$, which includes any parasitic capacitance of switch 33, as shown in phantom in FIG. 2, may be coupled in parallel with switch 33 to sufficiently change the impedance of, i.e. detune, the starting circuit in order to extinguish the glow discharge in the chamber 32 (FIG. 1).

Figure 3:
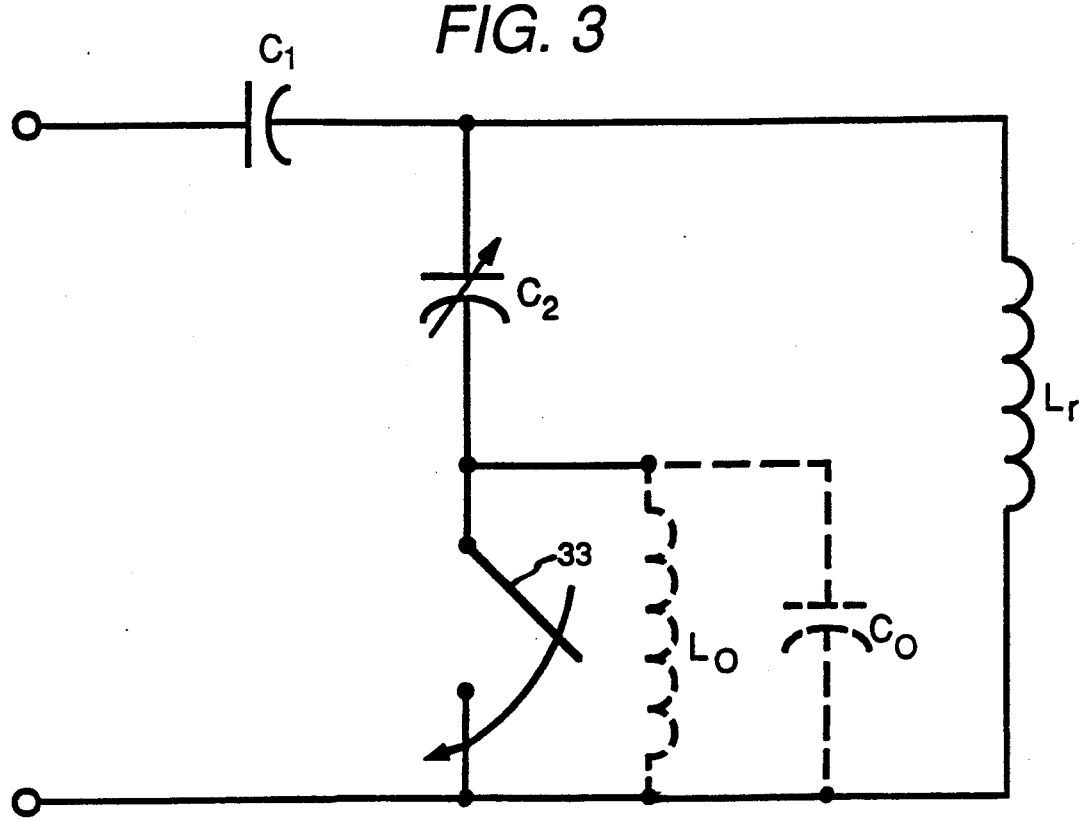
FIG. 3 is a schematic illustration of another alternative embodiment of the startint circuit of the present invention.
Figure 4:
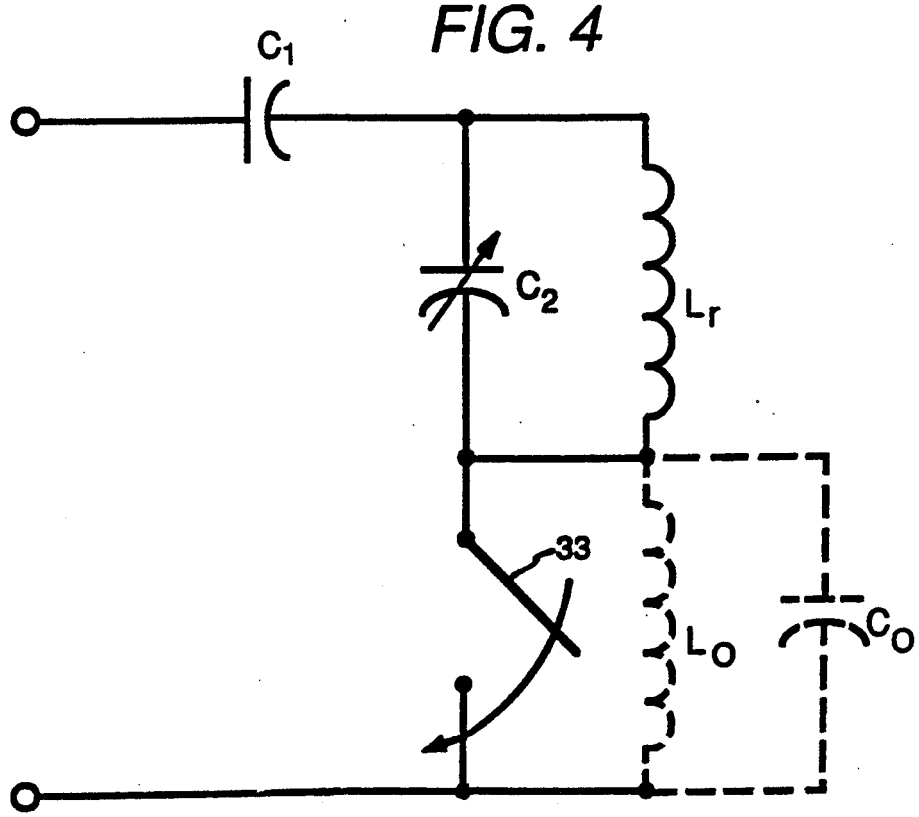
FIG. 4 is a schematic illustration of still another alternative embodiment of the starting circuit of the present invention.

Still other alternative embodiments of the starting circuit of the present invention are illustrated in FIGS. 3 and 4. In FIG. 3, detuning switch 33 is coupled in series with tuning capcitor $C_2$ for removin capcitor $C_2$ from, and hence detuning, the starting circuit after initiation of the arc discharge. Alternatively, in FIG. 4, detuning switch 33 is coupled in series with the parallel combination of capacitor $C_2$ and inductor $L_r$ for decoupling the parallel combination thereof from the starting circuit after initiation of the arc discharge. As shown in phantom in FIGS. 3 and 4, an additional resonant circuit, e.g. a parallel LC network $L_o$ and $C_o$, which includes any parasitic capacitance of swich 33, as shown in phantom in FIG. 2, may be coupled in parallel with switch 33 to sufficiently change the impedance of, i.e. detune, the starting circuit in order to extinguish the glow discharge in the starting chamber 32 (FIG. 1).

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A starting circuit for an electrodeless high intensity discharge lamp of the type having an excitation coil situated about an arc tube and coupled to a radio frequency power supply for exciting an arc discharge in an ionizable fill contained in said arc tube, comprising:
    a starting probe disposed proximate to said arc tube and establishing a parasitic capacitance between said excitation coil and said starting probe; and
    resonant circuit means for receiving a radio frequency signal from said radio frequency power supply and providing a resonant starting voltage to said starting probe of sufficient magnitude to initiate the arc discharge in said arc tube, said resonant circuit means including a variable inductance coupled in series with the parasitic capacitance between said excitation coil and said starting probe.

2. The starting circuit of claim 1, further comprising detuning means coupled to said resonant circuit means for detuning said starting circuit after initiation of the arc discharge.

3. The starting circuit of claim 2 wherien said variable inductance comprises a tuning capacitor coupled in parallel with a fixed inductor.

4. The starting circuit of claim 3 wherein said detuning means comprises a detuning switch coupled in series with said inductor such that said detuning switch is opened after initiation of the arc discharge.

5. The starting circuit of claim 3 wherien said detuning means comprises a detuning switch coupled in series with said tuning capacitor such that said detuning switch is opened after initiation of the arc discharge.

6. The starting circuit of claim 3 wherein said detuning means comprises a detuning switch coupled in series with the parallel combination of said inductor and said tuning capacitor such that said detuning switch is opened after initiation of the arc discharge.

7. The starting circuit of claim 1 wherein said starting probe comprises a gas probe starter including:
    a starting chamber having a wall enclosing an interior containing a gas, said chamber being attached to the outer wall of said arc tube; and
    a starting electrode for coupling said starting voltage to the interior of said starting chamber so as to initiate a glow discharge in said starting chamber which is capacitively coupled to the fill in said arc tube.

8. The starting circuit of claim 7, further comprising detuning means coupled to said resonant circuit means for detuning said starting circuit after initiation of the arc discharge.

9. The starting circuit of claim 8 wherein said detuning means comprises a detuning switch coupled in said resonant circuit so as to be opened after initiation of the arc discharge in order to detune said starting circuit, thereby substantially reducing said starting voltage.

10. The starting circuit of claim 9, further comprising an additional resonant circuit coupled in parallel with said detuning switch for ensuring that said glow discharge in said starting chamber is extinguished after initiation of the arc discharge.

11. The starting circuit of claim 10, wherein said additional resonant circuit comprises a parallel LC circuit.

12. An electrodeless high intensity discharge lmap system, comprising:
    a light-transmissive arc tube for containing a fill;
    an excitation coil disposed about said arc tube and coupled to a radio frequency power supply for exciting an arc discharge in said fill;
    a starting probe disposed proximate to said arc tube and establishing a parasitic capacitance between said excitation coil and said starting probe; and
    resonant circuit means for receiving a radio frequency signal from said radio frequency power supply and providing a resonant starting voltage to said starting probe of sufficient magnitude to initiate the arc discharge in said arc tube, said resonant circuit means including a variable inductance coupled in series with the parasitic capacitance between said excitation coil and said starting proble.

13. The lamp system of claim 12, further comprising detuning means coupled to said resonant circuit means for detuning said starting circuit after initiation of the arc discharge.

14. The lamp system of claim 13 wherein said variable inductance comprises a tuning capacitor coupled in parallel with a fixed inductor.

15. The lamp system of claim 14 wherein said detuning means comprises a detuning switch coupled in series with said inductor such that said detuning switch is opened after initiation of the arc discharge.

16. The lamp system of claim 14 wherein said detuning means comprises a detuning switch coupled in series with said tuning capacitor such that said detuning switch is opened after initiation of the arc discharge.

17. The lamp system of claim 14 wherein said detuning means comprises a detuning switch coupled in series with the parallel combination of said inductor and said tuning capacitor such that said detuning switch is opened after initiation of the arc discharge.

18. The lamp system of claim 12 wherien said starting probe comprises a gas probe starter including:

a starting chamber having a wall enclosing an interior containing a gas, said starting chamber being attached to the outer wall of said arc tube; adn a starting electrode for coupling said starting voltage to the interior of said starting chamber so as to initiate a glow discharge in said starting chamber which is capacitively coupled to the fill in said arc tube.

19. The lamp system of claim 18, further comprising detuning means coupled to said resonant circuit means for detuning said starting circuit after initiation of the arc discharge.

20. The lamp system of claim 19 wherein said detuning means comprises a detuning switch coupled in said resonant circuit so as to be opened after initiation of the arc discharge in order to detune said starting circuit, thereby substantially reducing said starting voltage.

21. The lamp system of claim 20, further comprising an additional resonant circuit coupled in parallel with said detuning switch for ensuring that said glow discharge in said starting chamber is extinguished after initiation of the arc discharge.

22. The lamp system of claim 21 wherein said additional resonant circuit comprises a parallel LC circuit.

* * * * *